(12) United States Patent
Olmstead (10) Patent No.: US 8,657,196 B2
(45) Date of Patent: Feb. 25, 2014

(54) SYSTEMS AND METHODS OF CAPTURING SECURITY IMAGES IN AN AUTOMATED DATA READER

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 13/357,334

(22) Filed: Jan. 24, 2012

(65) Prior Publication Data
US 2012/0187191 A1    Jul. 26, 2012

Related U.S. Application Data

(60) Provisional application No. 61/435,669, filed on Jan. 24, 2011.

(51) Int. Cl.
*G06K 19/00*      (2006.01)

(52) U.S. Cl.
USPC ....... 235/462.01; 235/435; 235/439; 235/454

(58) Field of Classification Search
USPC ........................................................ 235/462
See application file for complete search history.

(56) References Cited

U.S. PATENT DOCUMENTS

| | | | |
|---|---|---|---|
| 5,497,314 A | | 3/1996 | Novak |
| 5,609,223 A | | 3/1997 | Iizaka et al. |
| 5,679,941 A | * | 10/1997 | Iizaka et al. ................... 235/383 |
| 6,959,871 B1 | * | 11/2005 | Herrod et al. ............ 235/462.13 |
| 7,234,641 B2 | * | 6/2007 | Olmstead ....................... 235/454 |
| 7,337,960 B2 | | 3/2008 | Ostrowski et al. |
| 2005/0011955 A1 | * | 1/2005 | Saito ......................... 235/462.04 |
| 2009/0090583 A1 | * | 4/2009 | Bonner et al. ................... 186/59 |
| 2011/0248083 A1 | | 10/2011 | Bonner et al. |

OTHER PUBLICATIONS

International Search Report and Written Opinion for PCT/US2012/022431 filed Jan. 24, 2012, mailed Sep. 5, 2012 10 pgs.

* cited by examiner

*Primary Examiner* — Michael G Lee
*Assistant Examiner* — Matthew Mikels
(74) *Attorney, Agent, or Firm* — Stoel Rives LLP

(57) ABSTRACT

The present disclosure is directed to systems and methods for detecting and handling exception situations in an automated data reading system. In one configuration, an illumination source is triggered to generate light pulses and a security imager is triggered synchronous with light pulses of the illumination source. The security imager captures security images of items that are transported through an automated data reader, e.g. optical code reader. The captured security images are configured to be displayed for a user or operator to use to identify an exception item. A plurality of decode imagers capture image data that can be used to identify and read an optical code disposed on an item transported through the automated data reader. The decode imagers capture images synchronous with light pulses of the illumination source.

31 Claims, 6 Drawing Sheets

SYSTEMS AND METHODS OF CAPTURING SECURITY IMAGES IN AN AUTOMATED DATA READER

RELATED APPLICATION DATA

This application claims the benefit under 35 U.S.C. §119 (e) of U.S. Provisional Patent Application No. 61/435,669, filed Jan. 24, 2011, which is hereby incorporated by reference herein in its entirety.

BACKGROUND

The field of the present disclosure relates generally to data readers, such as optical scanners (e.g., barcode scanners). More particularly, this disclosure relates to systems and methods for detecting and handling exception situations in an automated data reading system.

Various types of optical data readers, such as manual readers, semi-automatic readers and automated readers, are available to acquire and decode the information encoded in optical codes such as barcodes. In a manual reader (e.g., a hand-held type reader, a fixed-position reader), a human operator positions an object relative to the reader to read the optical code associated with the object. In a semi-automatic reader, either checker-assisted or self-checkout, objects are moved usually one at a time by the user into or through the read zone of the reader and the reader then reads the optical code on the object. In an automated reader (e.g., a portal or tunnel scanner), an object is automatically positioned (e.g., transported through the read zone via a conveyor) relative to the reader, with the reader automatically reading the optical code on the object.

An automated data reader such as an automated scanner at a grocery store checkstand or other retail point of sale (POS) may enable automated totaling of the cost of a customer's purchases. Items for purchase are deposited on, for example, an entry conveyor and the conveyor moves the items through a read zone (or scan volume or scanning area). An optical code (e.g., a barcode), radio frequency identification (RFID) tag, or other technology that provides information to identify an item may be printed on or otherwise affixed to the item or the packaging of the item. Information that is successfully read by the automated scanner (from the optical code, RFIG tag, etc.) can be transformed by the automated scanner into electrical signals that can be decoded into alphanumerical characters or other data. The alphanumerical characters or other data can be used as input to a data processing system, such as a POS terminal (e.g., an electronic cash register). The POS terminal uses the data to determine the price for the article, apply electronic coupons, and award points for a retailer or other rewards program, etc.

When a data reader attempts to read identifying information on an item, an error may occur. The error needs to be corrected or otherwise resolved for proper functioning of the system. For example, when an error occurs with a manual or semi-automatic data reader, the human operator typically rescans the object or manually enters (e.g., via a keyboard) a number (e.g., a UPC number) corresponding to the object.

The present inventors have recognized that although automated data readers may scan all the sides of an item, under some circumstances one or more sides of an item cannot be effectively scanned. For example, one item may shadow or block another item. If an item is not successfully read by the automated data reader, an exception situation occurs. The cost of the unscanned item may not be added to the total purchase amount unless the item is rescanned or the information of the item is manually entered into the POS. Other situations can also occur that cause exceptions. For example, multiple barcodes or identifiers on an item can result in an item being scanned twice (e.g., in a single pass), potentially generating conflicting information. The present inventors have further recognized that an automated data reader needs to determine automatically whether an error or an unexpected event occurs. Thus, accurate identification and handling of errors and unexpected events that occur in automatic readers may be desirable.

SUMMARY

The present disclosure is directed to systems and methods for capturing security (or exception) images in automated data reading systems and for detecting and handling exceptions. In one embodiment, the system is configured to trigger an illumination source to generate light pulses and may also trigger a security imager synchronously with light pulses of the illumination source. The captured security images may be configured to be used by a user or operator to identify an exception item.

BRIEF DESCRIPTION OF THE DRAWINGS

Understanding that drawings depict only certain preferred embodiments and are not therefore to be considered to be limiting in nature, non-limiting and non-exhaustive embodiments of the disclosure are described and explained with additional specificity and detail through the use of the accompanying drawings, in which.

DETAILED DESCRIPTION

Automated data reading systems, such as may be found in a checkstand (or a checkout lane) at a grocery store, supermarket, big box store, or other retail point of sale (POS), or in an industrial location such as a parcel distribution station, automatically read or identify items passed through a read zone and, in the case of the retail location, also automatically total a customer's purchases for collecting payment. Automated data reading systems may include an automated data reader, such as a tunnel scanner or portal scanner, that automatically scans items to be purchased. The automated data reader may be, for example, an automated optical data reader, which may comprise one or more optical code readers. An optical code reader may be, for example, a laser scanner or an imaging data reader. An example of an imaging data reader may be a decode imager. Alternatively, the automated data reader may utilize radio frequency identification (RFID) technology to identify items from an RFID tag on each item.

An automated optical data reader may include optical code readers that can identify and optically read data, or encoded optical symbols or optical codes such as barcodes, on objects passed through a read zone of the automated optical data reader. As an optical code is passed through a read zone (or a scan volume or scanning area) the optical code may be read by an optical code reader and transformed into electrical signals. The electrical signals can be decoded into alphanumerical characters or other data that can be used as input to a data processing system, such as a POS terminal (e.g., an electronic cash register). The POS terminal can use the decoded data to, for example, look up a price for the article, apply electronic coupons, and award points for a retailer or other rewards program. Automated scanning of an optical code on items enables automated totaling of the prices of items to be purchased by the customer. For the purposes of the present description, the term automated is used to indicate that a function is performed or occurs by a machine or apparatus independently, reducing human intervention or without human intervention.

In a process for a fully automated checkout system, a customer and/or a checkout clerk (employee) places items to be purchased on a conveyor and/or other transport mechanism that may automatically feed the items through a read zone (or scan volume or scanning area) of the automated optical data reader. One or more optical code readers may be configured and positioned around the read zone to scan each item for a barcode or other optical code.

An item can have multiple sides, any of which might include the barcode for the item. For example, a simple six-sided rectangular box-shaped item can have a leading side (or side leading the item through the read zone), a trailing side (opposite the leading side and last through the read zone), a bottom side, a top side, a front side positioned nearest to or facing the checkout clerk or operator (also known as the checker side), and a back side positioned away from the checkout clerk or operator (also known as the customer side). Accordingly, automated scanning may involve an automated optical data reader scanning each of the sides of an item as it passes through the read zone, to identify and capture the barcode or other optical code, regardless of the side on which the barcode or other optical code is positioned.

Although automated optical data readers may scan all the sides of an item, under some circumstances one or more sides of an item may not be effectively scanned. For example, a second item may shadow or otherwise block one or more sides of the item from being scanned. In such circumstances when a side of an item is not effectively scanned, a barcode or other optical code may not be detected and the item may pass through the automated optical data reader unscanned, which creates an exception situation. For example, when an item passes through the automated optical data reader unscanned, the price of the item is not automatically added to the total cost of the items.

Other exception situations can also occur. For example, an item may have multiple barcodes and, thus, may be scanned multiple times (e.g., in a single pass). Still further, one or more of the various barcodes may be provided on the item from various sources and may contain different information, such that an item may be scanned twice (e.g., in a single pass) and each scan may obtain conflicting (i.e., different) pricing or other information.

Although exception situations are undesirable, they are generally inevitable. An exception situation is of concern, particularly for a store owner, if unnoticed or undetected and if it passes unresolved. Various methods and mechanisms are employed to automatically detect exception situations as part of an automated checkout process. To enable effective resolution of the exception situation, however, it must be effectively communicated to the customer, the checkout clerk, an attendant, or other user or operator. An effectively communicated exception situation can be efficiently and effectively resolved. Providing an alarm, or even an error message, that an exception situation has occurred may not be sufficient or effective, particularly when multiple items are passing through the automated optical scanner in relatively rapid succession.

One way that exception situations can be communicated is by employing a security (or exception) camera (or imager) to capture an image of the item creating the exception situation (the "exception item") and communicating the captured image to the current customer, a checkout clerk, an attendant, or another user of the automated data reading system. The image can further be communicated with a description of the exception situation. Capturing an image of the exception item may enable easy and convenient exception handling. The exception items can easily be identified by an operator or user from the captured image and rescanned (i.e., passed through the automated optical data reader or scanned with a handheld data reader), added to the total manually through the POS of the automated data reading system, or otherwise processed to resolve the exception situation. A captured image of an exception item can also enable later identification of the exception item, eliminating a need to process exception situations nearly at the point in time they occur. The exception item can be identified after passing through the automated optical data reader.

Automated optical data readers may have difficulty effectively capturing images of exception items with a security (or exception) camera. This difficulty may result because the purpose for which a security camera is configured and well-suited is different than the purpose for which an optical code reader is configured and well-suited. A security camera is intended and used to capture human readable images of excepted items, such that a user can easily identify the exception item. Higher resolution images, images with a wider field of view, and/or color images may be desirable. By contrast, an optical code reader of an automated optical data reader may be configured to capture images of targeted optical symbols. The optical code reader may capture images from which a human may not recognize or otherwise easily identify an exception item.

To facilitate capturing optical codes and/or minimize exception situations, automated optical data readers may be configured to enhance operation of optical code readers. Functionality, structure, processes, lighting (or illumination), and other conditions and aspects of the automated optical data readers are configured to improve that ability of the optical code readers to capture images of optical codes, which frequently does not enhance, or in some instances counteracts, the ability of the security camera to capture human readable images of exception items.

More specifically, automated optical data readers may be configured and better suited to enable optical code readers to identify and distinguish light and dark areas (or black and white areas) and to differentiate the thickness of light and/or dark areas. Colors of the object, or even a gray-scale variation thereof, may be irrelevant, and in effect filtered to black and white by optical data readers. The optical data reader may also seek to capture a smaller field of view (i.e., a focused image of the area of the barcode on the item), as compared to more complete images, or fully complete images, of an item that can be used to identify the item. Also, the lighting or illumination source of automated optical scanners may be configured to be suitable or desirable to capture a high-quality image of a barcode or other optical code (which may include monochromatic lighting or lighting with a poor color balance from a human viewing perspective) and, thus, may substantially differ from lighting suited for capturing a human readable image of an item. As a result, the quality of images captured by security cameras may be diminished due to motion blur, incorrect white balance and other color rendition artifacts, skew, wobble, partial exposure, and other undesirable characteristics caused by an incompatibility of the automated optical data reader configuration and appropriate conditions for proper functioning of the security camera.

Certain security cameras employ complementary metal oxide semiconductor (CMOS) digital imager technology and use rolling shutters to expose pixels in an imager sensor array. CMOS imagers may be built in high volume wafer fabrication facilities used for related technologies such as microprocessors and chip sets. Thus, CMOS imagers cost less than charge coupled device (CCD) imagers, another common digital imager technology. In addition, the common fabrication processes used to create CMOS imagers permit a CMOS pixel array to be integrated on a single circuit with other electronic devices such as clock drivers, digital logic, analog/digital converters and other suitable electronics. The compact structures possible for a CMOS imager may also reduce space requirements and lower power consumption.

CMOS based imagers traditionally use rolling shutters to expose pixels in the sensor array. With a rolling shutter, rows of pixels are cleared, exposed, and read out in sequence. During integration, a row of pixels is exposed to light energy and each pixel builds an electric charge corresponding to the amount and wavelengths of light impinging the pixel. Because the rows are activated and read out in sequence, there is an elapsed time between when the first row integrates and when the last row integrates.

The elapsed time between when the first row begins to integrate and when the subsequent rows begin to integrate can cause motion blur, such as skew and wobble with moving objects (such as items on a conveyor of an automated optical scanner). Also, pulsed illumination typically used in conjunction with optical scanners can create other undesirable effects. For example, pulsed red light can distort the white balance of images captured when the red light is present (i.e., on) as compared to images captured when the red light is absent (i.e., off). Pulsed white light can also cause havoc with the white balance of captured images, because some images or portions of images may be exposed with the pulsed white light while other images or portions of images may be exposed with the ambient light. Pulsed illumination may also be pulsed at a rate faster than the time between when the first row integrates and when the last row integrates, which can cause partial exposure.

The present disclosure provides systems and methods that may attempt to address these issues for automated scanner systems employing security cameras. Certain embodiments are directed to automated scanners having a security imager triggered to capture security images synchronous with light pulses of an illumination source, to produce high-quality images from which a customer and/or a checkout clerk (or other employee) can identify an item that corresponds to an exception situation that may occur during scanning by the automated optical scanner. The security imager may include a global shutter or other mechanism to enable complete exposure of the imager (i.e., exposure of all the pixels of the imager) with a single pulse of light of the illumination source.

Figure 1:
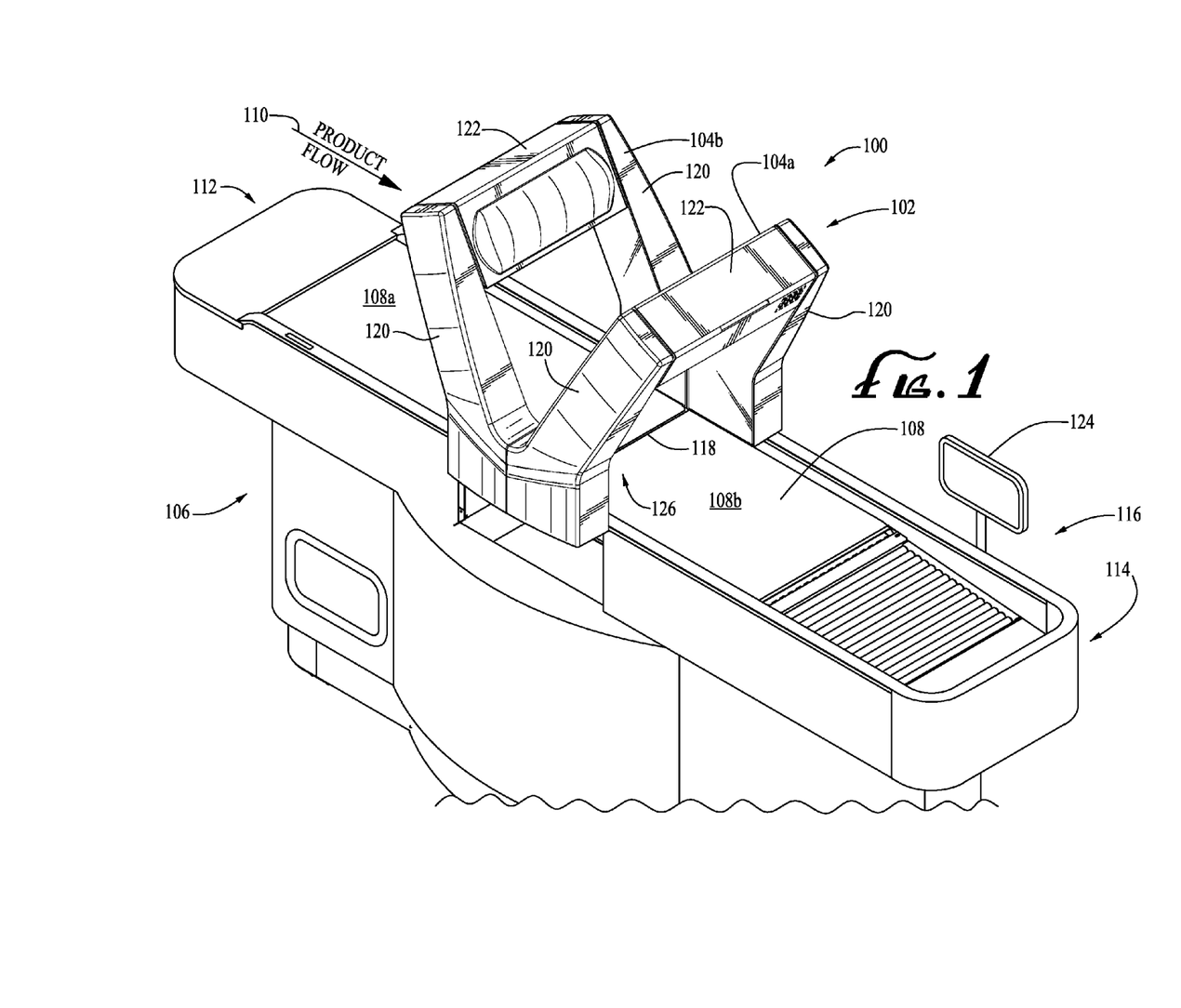
FIG. 1 is an isometric view of an automated optical data reader in an automated checkout system at a retail checkstand, according to one embodiment.

FIG. 1 is an isometric view of an automated optical data reader 102 in an automated data reading system 100 at a retail checkstand 106, according to one embodiment of the present disclosure. The automated optical data reader 102 may include one or more arches 104a, 104b (or portals) and a conveyor 108, or other transport mechanism. The arches 104a, 104b may be configured to vertically and/or diagonally extend above the counter-level of the checkstand 106 in an inverted U-shaped structure. Thus, the arches extend from one side of the checkstand 106 to the other, over the conveyor 108, creating a structure (e.g., a tunnel or portal) through which items are transported to be automatically scanned.

The automated optical data reader 102 of FIG. 1 includes two arches, a rear arch 104a and a front arch 104b. The rear arch 104a and front arch 104b are arranged and configured to form, as viewed from the side, somewhat of a V shape or a Y shape. The arches 104a, 104b may include one or more posts 120 (or legs) that extend vertically and/or at an angle above the conveyor 108 and thereby support a horizontal cross arm 122 above the conveyor 108. In the illustrated embodiment, each arch 104a, 104b includes two posts 120 and a cross arm 122, forming an archway (or inverted U-shape) over the conveyor 108. The arches 104a, 104b may house one or more imagers configured to capture image data of items as they pass through the automated optical data reader 102, as will be described. The arches 104a, 104b may also house an illumination source, as will also be explained. An example of an illumination source is described in U.S. Application No. 61/435,777, filed on Jan. 24, 2011, which is hereby incorporated herein in its entirety.

The conveyor 108 or other transport mechanism may include one or more conveyors. In the illustrated embodiment, the transport mechanism 108 includes an entry conveyor section 108a positioned at a first end 112 (or entry end) of the automated data reading system 100 and an exit conveyor section 108b positioned at a second end 114 (or exit end) of the automated data reading system 100. Items to be scanned can be deposited on the entry conveyor section 108a at the first end 112 of the checkstand 106 and they will be automatically transported in the direction of product flow indicated by the arrow 110, into the one or more arches 104a, 104b and toward the second end 114 of the checkstand 106. The items pass through the arches 104a, 104b and into the one or more read zones 126 (or scanning volume) of the automated optical data reader 102. The one or more read zones 126 may be located within or near the arches 104a, 104b and where items pass when transported through the arches 104a, 104b. The items to be scanned are automatically transferred from the entry conveyor section 108a to the exit conveyor section 108b for transport through and out of the arches 104a, 104b to a collection area 116 where they can be bagged or otherwise collected by the customer, a checkout clerk, or other user or operator. A gap 118 at the transition between the entry conveyor section 108a and the exit conveyor section 108b may allow bottom imagers to capture images of the bottom side of items for reading optical codes on the bottom side of items as they are passed over the gap 118.

The automated data reading system 100 may further comprise a display 124 to present security images from which a user or operator can identify exception situations. The security images communicate which item(s) caused an exception situation. The display 124 may further communicate information about the exception, such as a description of the exception. The display 124 is preferably the display for the POS, positioned typically near the bagging area at the second end 114 (or exit end) of the automated data reading system 100. When an exception occurs, an image from the security camera is displayed on display 124, typically along with a description of the type of exception and how to correct it. For example, the display might indicate that the item went through the arches 104a, 104b without its barcode being scanned and would indicate to the operator that the item needs to be manually scanned or otherwise re-scanned. In another embodiment, the display could be connected to a processor that controls the automated optical data reader 102.

Other suitable arrangements and configurations of one or more arches 104a, 104b and transport mechanisms 108 are envisioned. For example, the arches 104a, 104b may be arranged in a U-shaped configuration, and thus may be more or less open or even a fully enclosed tunnel configuration. Still another embodiment may comprise only a single arch (or portal). The cross arm of the single arch may be widened to accommodate imagers to capture both leading images and trailing images of items. In another embodiment, the transport mechanism 108 may comprise a plurality of rotating rollers. In another embodiment, the display 124 may be incorporated with the POS, such that security images are displayed on the monitor of the POS terminal.

Figure 2A:
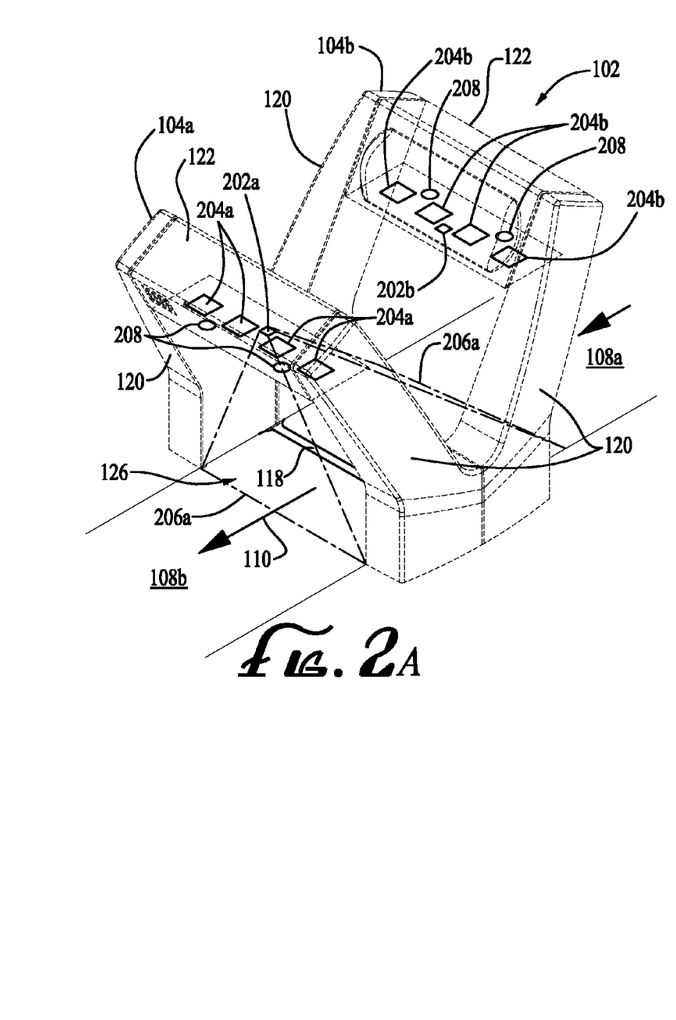
FIGS. 2A and 2B are isometric views of an automated optical data reader, illustrating the fields of view (FOVs) of a rear security imager and a front security imager.
Figure 2B:
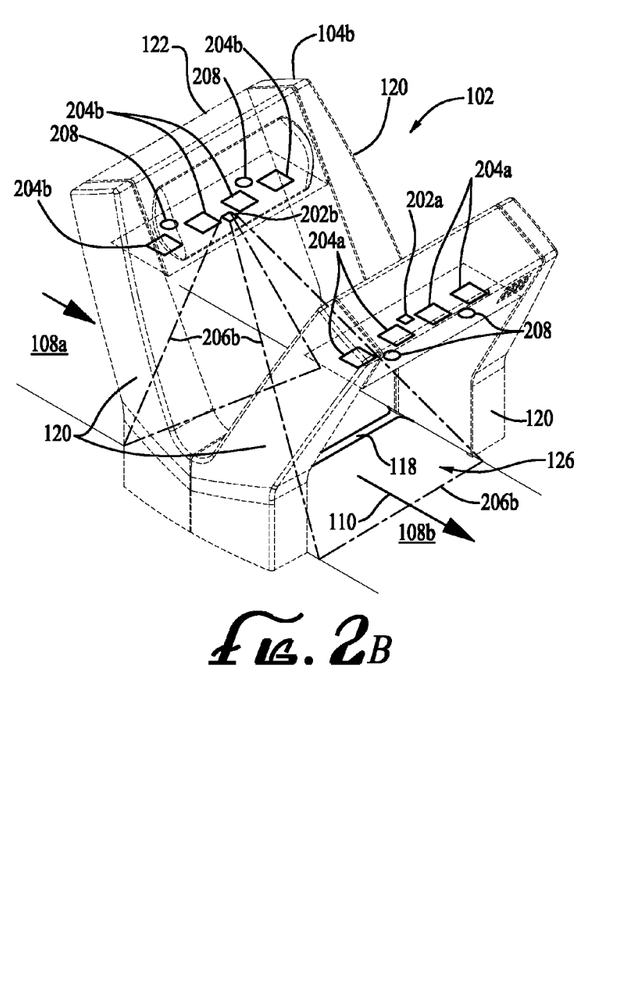
Figure 3:
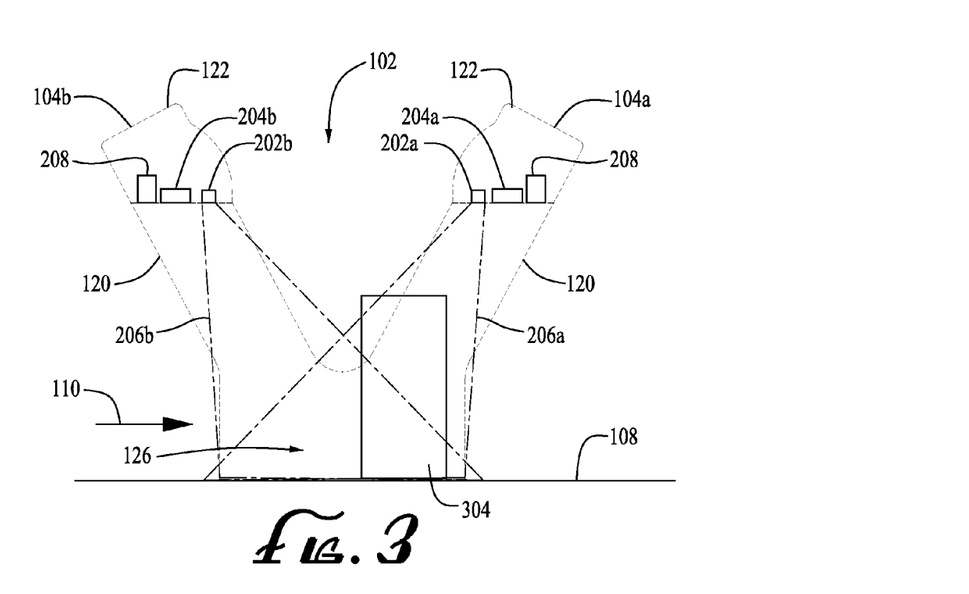
FIG. 3 is a diagrammatic side cross-sectional view of an automated optical data reader, according to one embodiment.
Figure 4:
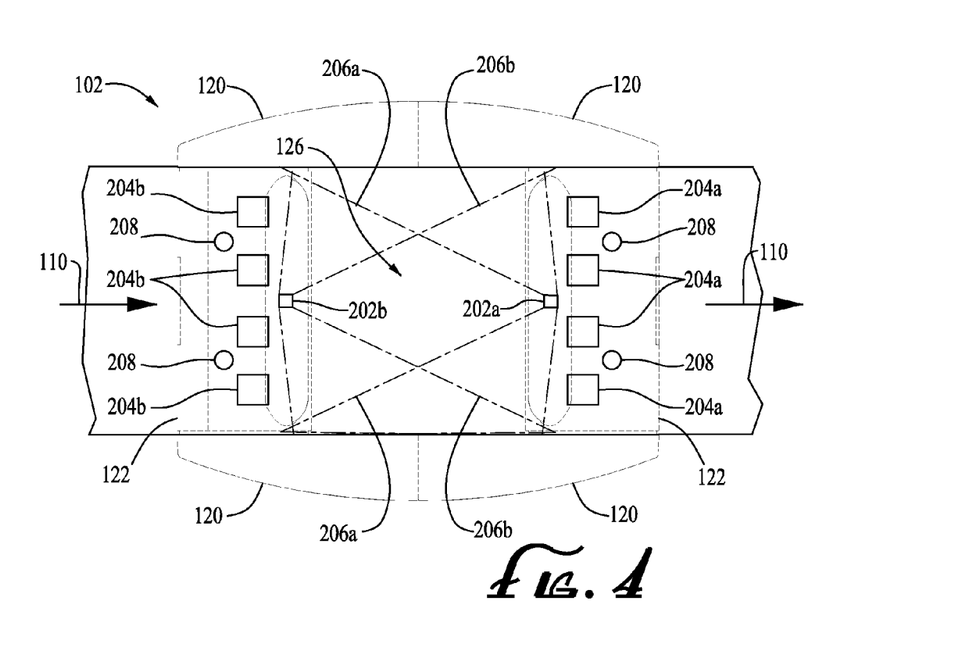
FIG. 4 is a top view of an automated optical data reader, according to one embodiment.

FIGS. 2A and 2B are isometric views of an automated optical data reader 102, illustrating a field of view (FOV) 206a of a security imager 202a for capturing security images of the leading side of an item and a FOV 206b of a security imager 202b for capturing security images of the trailing side of an item, respectively. FIG. 3 is diagrammatic side cross-sectional view of the automated optical data reader 102, showing the FOVs 206a, 206b of the security imagers 202a, 202b. FIG. 4 is a top view of the automated optical data reader 102, showing the FOVs 206a, 206b of the security imagers 202a, 202b. Discussion of the components of the illustrated embodiments is now given with reference to FIGS. 2A, 2B, 3, and 4, collectively.

As mentioned, the arches 104a, 104b each house one or more imagers to capture image data of items that pass through the automated optical data reader 102. The security imager 202a and a plurality of decode imagers 204a are housed in the cross-arm 122 of the rear arch 104a. The plurality of decode imagers 204a may be optical code readers. The plurality of decode imagers 204a are configured to capture leading images of an item 304 (see FIG. 3), or portions thereof. The leading images can be used to decode a barcode (or other optical symbol) on the item 304 as it is transported through the automated optical data reader 102, and more particularly as the item enters a scanning area or scanning volume in the direction of the product flow 110. Each decode imager 204a captures image data of a scene within its FOV. Similarly, the security imager 202a is configured to capture leading security images of the item 304 as it is transported through the automated optical data reader 102. The security imager 202a captures image data of a scene within its FOV 206a, as shown in FIG. 2A. If the item 304 is in the scene within the FOV 206a, then leading image data of the item 304 may be captured. FIG. 3 illustrates the item 304 positioned in the FOV 206a of the security imager 202a.

Similarly, the security imager 202b and a plurality of decode imagers 204b are housed in the cross-arm 122 of the front arch 104b. The plurality of decode imagers 204b may be optical code readers. The plurality of decode imagers 204b are configured to capture trailing images of the item 304, or portions thereof. The trailing images can be used to decode a barcode (or other optical symbol) on the item 304 as it is transported through the automated optical data reader 102 in the direction of the product flow 110. Each imager 204b captures image data of a scene within its FOV. Similarly, the security imager 202b is configured to capture trailing security images of the item 304 as it is transported through the automated optical data reader 102 in the direction of the product flow 110. The security imager 202b captures image data of a scene within its FOV 206b, as shown in FIG. 2B. If the item 304 is in the scene within the FOV 206b, then trailing image data of the item 304 may be captured. FIG. 3 depicts the item 304 exiting the FOV 206b of the security imager 202b.

The arches 104a, 104b may also house an illumination system, which may include an illumination source 208 positioned to illuminate the FOVs of the decode imagers 204a, 204b and any side decode imagers (not shown), and/or the FOVs 206a, 206b of the security imagers 202a, 202b. The illumination source 208 may produce white light (e.g., light having a distribution of wavelengths from approximately 380 nm to 750 nm). In certain embodiments, the illumination source 208 may comprise one or more broad spectrum LEDs configured to illuminate the read zones with multiple wavelengths of light within a wavelength band of approximately 380 nm to approximately 750 nm (i.e., white light). The intensity of the illumination source 208 is preferably sufficient to flood out, or overpower, ambient light, so as to produce a known and predictable illumination spectrum for exposure of the security imagers 202a, 202b.

In the illustrated embodiment of the automated optical data reader 102, the security imagers 202a, 202b include CMOS technology and employ a global shutter. Global shutter imagers have a different pixel structure than rolling shutter imagers. A global shutter imager exposes all pixels to light simultaneously during the exposure time. At the completion of the exposure time, the signal generated by each pixel as a result of the light integrated during exposure is transferred to a storage area located within the pixel region (e.g., a capacitor). During readout, the stored signal is transferred. Since all pixels are exposed at the same time, a "snap" shot of a moving target can be captured. The light source need only be enabled during this short exposure time (much like the flash of a digital camera), making the required light intensity much lower than for a conventional rolling shutter system.

The security imagers 202a, 202b are triggered so that a pulse of light by the illumination source 208 occurs in effect simultaneous with, or at least concurrent or overlapping with, the exposure time. In other words, the exposure time of the security imagers 202a, 202b occurs in effect synchronous with or concurrent with a pulse of light of the illumination source 208. By timing the exposure time of the security imagers 202a, 202b to be synchronous with a pulse of light of the illumination source 208, the pixels of the security imagers 202a, 202b are exposed primarily by the light from the illumination source 208. The width (or duration) of the illumination pulse is preferably short, to effectively capture images of objects with minimal motion blur. The exposure time is, therefore, also short, to coincide with the pulse width of the illumination source 208. The duty cycle of the exposure, being the ratio of the exposure time divided by the time period between image captures, is also very low. The ambient light is attenuated by this ratio. For example, if the exposure time is 250 microseconds, and the frame rate of image capture is 30 frames/second (33 ms between frames), then the duty cycle of the exposure is 0.75%. The imager would then capture all of the pulsed LED illumination but capture only 0.75% of the ambient light intensity. If the LED illumination and ambient illumination are of equivalent brightness to the human operator, the ratio of LED illumination to ambient illumination captured by the imager would be 1/0.75% or about 133:1, practically eliminating the effects of ambient light. The imager becomes essentially insensitive to, or unaffected by, ambient light. The illumination spectrum is defined or known in advance and allows the white-balance of the security imagers 202a, 202b to be pre-determined and constant, which may enhance and improve the image quality of security images captured by the security imagers 202.

As can be appreciated, the automated optical data reader 102 may include a plurality of illumination systems and/or zones of illumination sources. For example, the automated optical data reader 102 may include a first illumination source and a second illumination source. Alternatively, the illumination source 208 may include a first illumination zone and a second illumination zone. As another example, an illumination source for one or more bottom decode imager(s) (not shown) may produce red light, asynchronous to the illumination source 208 for the other decode imagers. A plurality of illumination sources, and/or grouping (or dividing) an illumination source, can eliminate the effects of specular reflection from light sources reflecting off of objects and can reduce glare of lights from one side of the system shining toward other imagers.

The illumination system may further comprise a trigger mechanism to synchronously pulse the illumination source 208. The pulse rate of the illumination source 208 is preferably faster than the flicker fusion rate of the human eye, such that a human cannot detect the pulsing of the illumination source 208. The illumination source may be triggered by a software command. All of the LEDs may be triggered at the same time. A master clock and/or a synchronization pulse may maintain the timing of the pulse of the illumination source 208. In another embodiment, the trigger mechanism may comprise hardware components to generate the pulsing at a desired rate. In another embodiment, the trigger mechanism may include a processor and a memory having stored thereon instruction code for the processor, which when executed cause the processor to pulse the illumination source 208.

As can be appreciated, the arches 104a, 104b may house additional decode imagers, such as side decode imagers. The side decode imagers may be positioned in the posts 120 of the arches 104a, 104b, and their respective FOVs may be directed across the conveyor 108 toward an opposite upright post 120. The arches 104a, 104b may also house additional security imagers. The arches 104a, 104b may also house additional LEDs 208 or other components of an illumination source.

Figure 5:
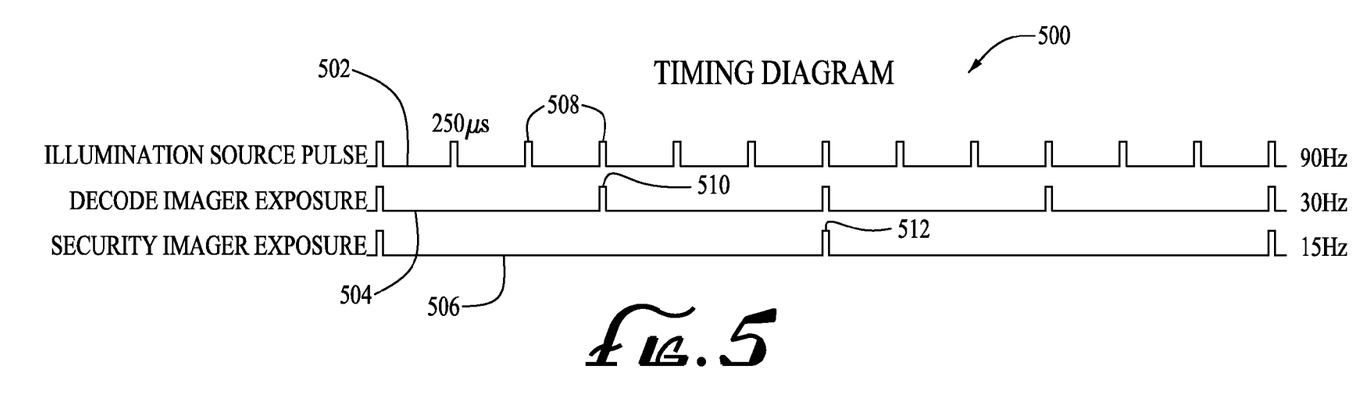
FIG. 5 is a timing diagram illustrating the timing relationship of an illumination source pulsing, a decode imager exposure, and a security imager exposure, according to one embodiment.

FIG. 5 is a timing diagram 500 illustrating the timing relationship of the illumination source pulsing (timeline 502), the decode imager exposure and/or decode trigger (timeline 504), and the security imager exposure and/or security trigger (timeline 506). In the illustrated timing diagram 500, the first timeline 502 represents the state of the illumination source pulse. Low values of the first timeline 502 represent when the illumination source is off. High values of the first timeline 502 represent when the illumination source is lit. The first timeline 502 illustrates a plurality of pulses 508 of the illumination source. The pulses 508 are evenly spaced at a frequency of, for example, 90 Hz, which is faster than the flicker fusion rate of the human eye. (The flicker fusion rate of the human eye is approximately 60 Hz.) The duration of each pulse 508 may be, for example, 250 µs, which may be fast enough to in effect freeze expected motion with respect to the imagers. The duration of each pulse 508 may also be in effect similar to the exposure time of the decode imagers 204a, 204b and/or the security imagers 202a, 202b for the given intensity of light. Pulsing the illumination source allows for greater intensity of light to be emitted at the appropriate time to integrate exposed pixels of the imagers and decreases the needed exposure time of the imagers.

The second timeline 504 represents the state of a decode imager exposure. Low values of the second timeline 504 represent when the decode imager is not exposed, or a global shutter of the decode imager is closed. High values of the second timeline 504 represent when the decode imager is exposed, or the global shutter is open. The second timeline 504 illustrates a plurality of decode imager exposures 510, each occurring in effect synchronous to a pulse 508 of the illumination source, although not necessarily with every pulse 508 of the illumination source. The duration of the exposure (the exposure time) is similar to the duration of a pulse 508 of the illumination source. More specifically, the duration of the exposure is sufficient to fully include a light pulse 508 of the illumination source and sufficiently short to limit ambient light from effecting the imager exposure.

The exposures 510 of the decode imagers may occur at a rate that is slower than the pulse rate of the illumination source, for example by a given factor. In other words, the rate of the exposures, or exposure rate, of the decode imagers may be a factor of the pulse rate of the illumination source. For example, in the illustrated embodiment, the decode imager exposure rate is 30 Hz, which is slower than the 90 Hz pulse rate of the illumination source by a factor of three (90 Hz/30 Hz). The 90 Hz pulse rate can be evenly divided by the 30 Hz exposure rate, and thus the decoder imager exposure rate is a factor of the pulse rate of the illumination source. The exposure rate of the decode imagers is slower than the pulse rate of the illumination source to not exceed a maximum frame rate of the decode imagers or to not exceed the maximum processing rate of the processor hooked to the decode imagers. The frame rate, or frame frequency, is the frequency (rate) at which an imaging device, such as a decode imager or a security imager, is able to produce unique consecutive images called frames. Typically, the frame rate of an imager, including a decode imager, is slower than the flicker fusion rate of the human eye. The frame rate accounts for both exposure time and read-out time (i.e., the time during which the exposure signal generated on the imager and transferred to storage is read out of storage and/or transferred to another component). The read-out time may be greater than the time between each pulse 508 of the illumination source. Accordingly, the imager is not ready to be exposed on each pulse of the illumination source and a slower rate is desirable to produce high quality decode images. Moreover, the automated optical scanner may need fewer images for decoding optical codes than would be produced with a frame rate that is faster than the flicker fusion rate, and thus a slower exposure rate is desirable. The slower exposure rate can also conserve power and resources.

The third timeline 506 of the timing diagram 500 represents the state of a security imager exposure. Low values of the third timeline 506 represent when the security imager is not exposed, or when the global shutter of the security imager is closed. High values of the third timeline 506 represent when the security imager is exposed, or the global shutter of the security camera is open. The third timeline 506 illustrates a plurality of security imager exposures 512, each occurring in effect synchronous to a pulse 508 of the illumination source, although not necessarily on every pulse 508 of the illumination source. The duration of the exposure (the exposure time) is similar to the duration of a pulse 508 of the illumination source. More specifically, the duration of the exposure is sufficient to fully include a light pulse 508 of the illumination source and sufficiently short to limit ambient light from effecting the security imager exposure.

The exposures 512 of the security imagers may occur at a rate that is slower than the pulse rate of the illumination source, for example by a factor. In other words, the exposure rate of the security imagers is slower than the pulse rate of the illumination source and may be slower by a factor. For example, in the illustrated embodiment, the security imager exposure rate is 15 Hz, which is slower than the 90 Hz pulse rate of the illumination source by a factor of six (90 Hz/15 Hz). The 90 Hz pulse rate can be evenly divided by the 15 Hz exposure rate, and thus the security imager exposure rate is a factor of the pulse rate of the illumination source. The exposure rate of the security imager is slower than the pulse rate of the illumination source to accommodate a desirable or optimal frame rate of the security imager. As mentioned, typically the frame rate of an imager, including a security imager, is preferably chosen to be slower than the flicker fusion rate of the human eye because the frame rate includes exposure time and read-out time. The read-out time may be greater than the time between each pulse 508 of the illumination source. Accordingly, the security imager may not be ready to be exposed on each pulse of the illumination source and a slower rate may be desirable to produce high quality security images. Moreover, relatively few security images may be needed for identifying exception situations than would be produced with a frame rate that is faster than the flicker fusion rate, and thus a slower exposure rate is desirable to reduce the amount of processing and storage memory used.

In other embodiments, exposure of the security imager may occur synchronously with a pulse of the illumination source and may be non-periodic and at a rate slower than the pulse rate of the illumination source.

Figure 6:
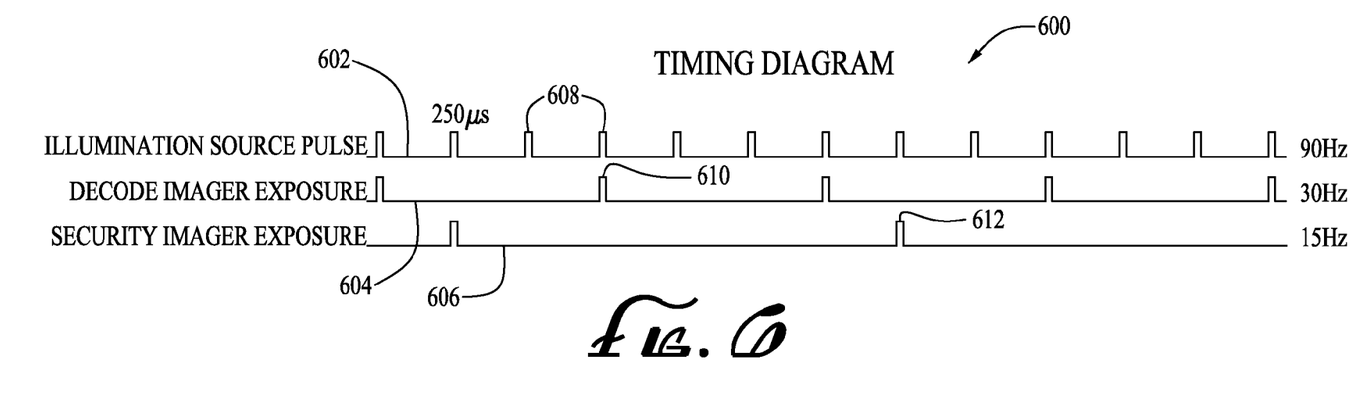
FIG. 6 is another timing diagram illustrating the timing relationship of an illumination source pulsing, a decode imager exposure, and a security imager exposure, according to another embodiment.

The exposure rate of the security imager may also be slower than the exposure rate of the decode imager. The security imager is configured to capture sufficient image data to produce high-quality images from which a customer and/or a checkout clerk (or other employee) can identify an item that corresponds to an exception situation that may occur during scanning by the automated optical scanner. The security images may have a higher resolution. The security imager may also capture color image data. Accordingly, the read-out time of the security imager may be longer than the read-out time for a decode imager, and thus the security imager may not be ready for exposure as quickly as the decode imager. In the illustrated embodiment, the exposure rate of the security imager is one half the exposure rate of the decode imager. As can be appreciated, however, the exposure rate of the security imager need not be a factor of the exposure rate of the decode imager. Moreover, the exposure 512 of the security imager need not occur with the exposure 510 of the decode imager, but can occur on a different pulse 508 of the illumination source, as shown in FIG. 6, and described below with reference to the same. Furthermore, the exposure triggers for the security camera need not be periodic. The security camera could be triggered when it is known that an object is within the FOV. Triggering when the object is within the FOV could be enabled by the object breaking the beam of a light curtain or by some other means. The security camera could be triggered at the next illumination pulse period after an object has been detected. Triggering at the next illumination pulse may further reduce the number of security images for the automated scanning system to process, thus improving the power efficiency of the system and reducing the complexity of the communication with other parts of the system and the POS.

The timing diagram 500 may also be representative of the triggers of the illumination source, the decode camera, and the security camera. Generally, the time between the trigger and the desired effect from the trigger may be small, such that the trigger almost instantaneously causes the desired effect. For example, a trigger of the illumination source may almost immediately result in a light pulse, a trigger of the decode camera may almost immediately result in an exposure of the decode camera, and/or a trigger of the security imager may almost immediately result in an exposure of the security camera. Accordingly, a trigger of the decode imager that is in effect synchronous with a trigger of the illumination source may result in an exposure 510 of the decode imager that is in effect synchronous with, or coincident with, a light pulse 508 of the illumination source. Similarly, a trigger of the security imager that is in effect synchronous with a trigger of the illumination source may result in an exposure 512 of the security imager that is in effect synchronous with a light pulse 508 of the illumination source. As can be appreciated, however, the time between a trigger and a desired effect may vary. Thus, the triggers may be asynchronous while still allowing a light pulse 508 of the illumination source and an exposure 510 of the decode imager and/or an exposure 512 of the security imager to occur synchronously or concurrently. As can also be appreciated, a plurality of decode imagers and/or security imagers may be asynchronously exposed relative to each other, yet be exposed synchronously or concurrently with a light pulse of the illumination source.

FIG. 6 is another timing diagram 600 illustrating the timing relationship of the illumination source pulsing, the decode imager exposure, and the security imager exposure, according to another embodiment. Again, a first timeline 602 of the diagram 600 represents the state of the illumination source pulse, a second timeline 604 represents the state of a decode imager exposure, and a third timeline 606 represents the state of a security imager exposure. In the illustrated diagram, an exposure 610 of the decode imager occurs in effect synchronous with a light pulse 608 of the illumination source. Similarly, an exposure 612 of the security imager occurs in effect synchronous with a light pulse 608 of the illumination source. However, the exposure 610 of the decode imager and the exposure 612 of the security imager are asynchronous, occurring on different pulses 608 of the illumination source.

Figure 7:
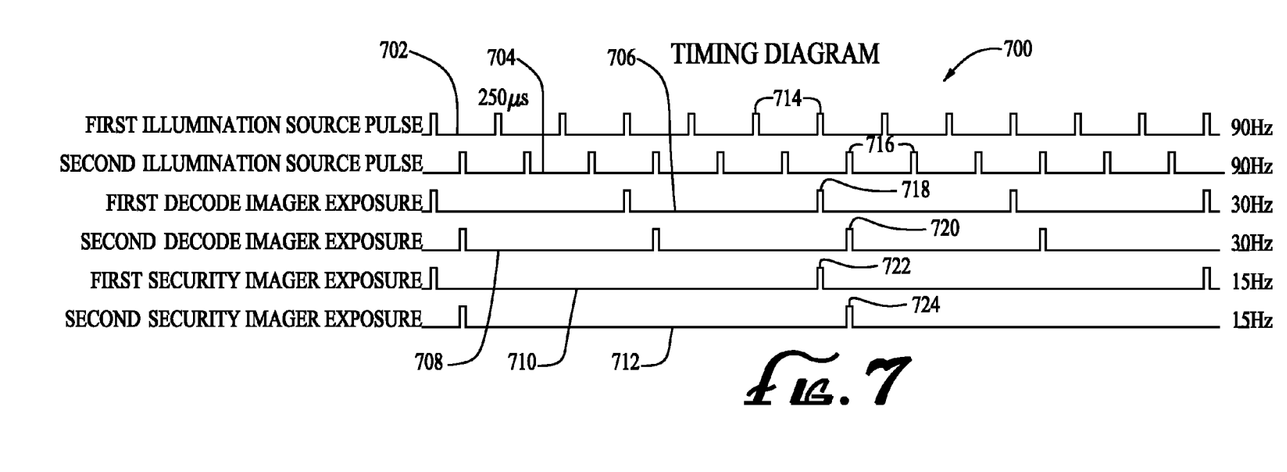
FIG. 7 is another timing diagram of an automated optical data reader having a plurality of illumination source zones pulsed out of phase.

FIG. 7 is another timing diagram 700 of an automated optical scanner having a plurality of illumination source zones pulsed out of phase. FIG. 7 illustrates the timing relationship of a first illumination source pulsing, a second illumination source pulsing, a first decode imager exposure, a second decode imager exposure, a first security imager exposure, and a second security imager exposure. A first timeline 702 of the diagram 700 represents the state of the first illumination source pulse, a second timeline 704 represents the state of the second illumination source pulse, a third timeline 706 represents the state of a first decode imager exposure, a fourth timeline 708 represents the state of a second decode imager exposure, a fifth timeline 710 represents the state of the first security imager exposure, and a sixth timeline 712 represents the state of the second security imager exposure. In the illustrated diagram, the light pulses 714 of the first illumination source and the light pulses 716 of the second illumination source are asynchronous. The first decode imager exposure 718 occurs in effect synchronous with a light pulse 714 of the first illumination source and the second decode imager exposure 720 occurs in effect synchronous with a light pulse 716 of the second illumination source. Similarly, the first security imager exposure 722 occurs in effect synchronous with a light pulse 714 of the first illumination source and the second security imager exposure 724 occurs in effect synchronous with a light pulse 716 of the second illumination source.

In other embodiments, the illumination sources, decode imagers, and/or security imagers may be grouped for triggering (e.g., staggered triggering) in any of a variety of different ways. For example, a grouping may be based on front and rear positions, relative to the product flow 110 (see FIG. 1). Alternatively, a grouping may be based on checker-side and customer-side. As another example, a grouping may be based on outer positioning (toward the edge or outside of the arches) and inner positioning (toward the middle of the arches). The groupings of imagers may be discrete (e.g., no imagers common to more than one grouping) or may be overlapping (e.g., one or more imagers may be triggered as part of a first grouping and as part of a second grouping).

Figure 8:
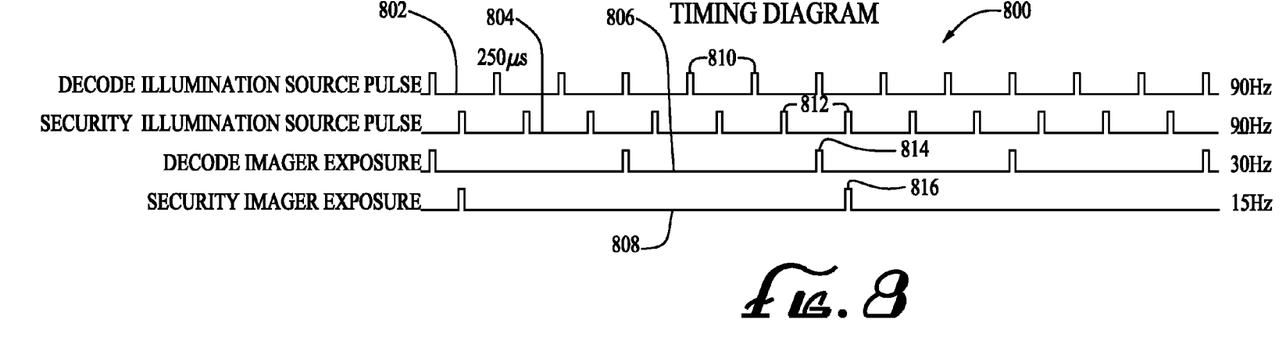
FIG. 8 is another timing diagram of an automated optical data reader having a decode illumination source and a security illumination source pulsed out of phase.

FIG. 8 is another timing diagram 800 of an automated optical scanner having a decode illumination source and a security illumination source pulsed out of phase. FIG. 8 illustrates the timing relationship of a decode illumination source pulsing, a security illumination source pulsing, a decode imager exposure, and a security imager exposure. A first timeline 802 of the diagram 800 represents the state of the decode illumination source pulse, a second timeline 804 represents the state of the security illumination source pulse, a third timeline 806 represents the state of a decode imager exposure, and a fourth timeline 808 represents the state of a security imager exposure. In the illustrated diagram 800, the light pulses 810 of the decode illumination source and the light pulses 812 of the security illumination source are asynchronous. The decode imager exposure 814 occurs in effect synchronous with a light pulse 810 of the decode illumination source and the security imager exposure 816 occurs in effect synchronous with a light pulse 812 of the security illumination source.

Figure 9:
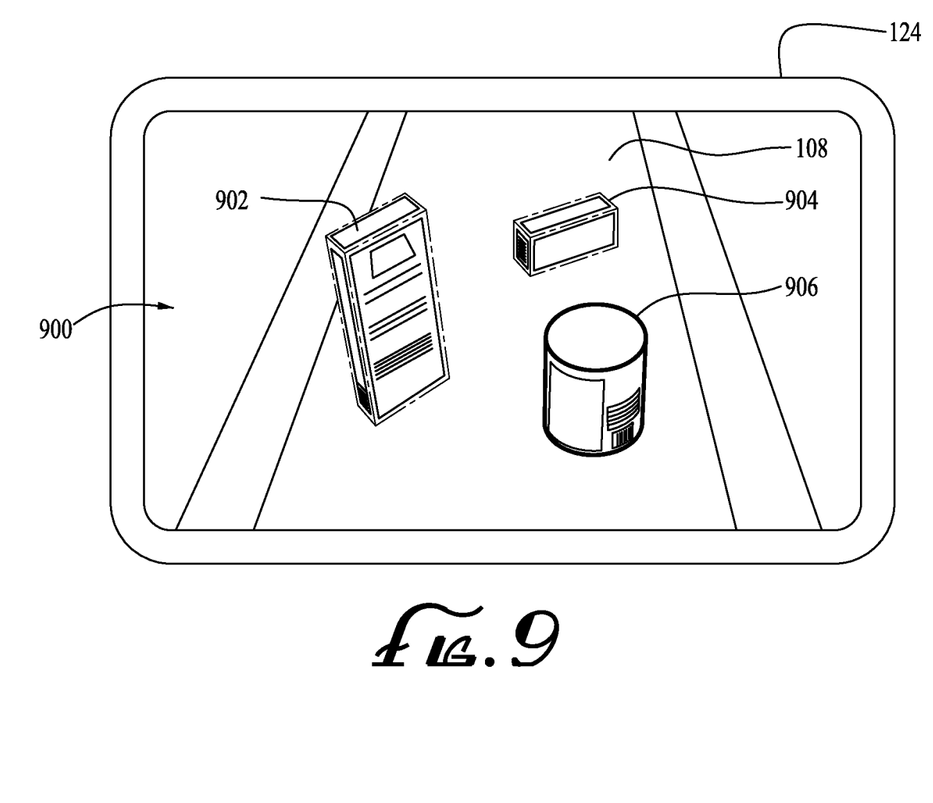
FIG. 9 is a depiction of a security image captured by a security camera of an automated data reader and displayed on a display to communicate an exception item.

FIG. 9 illustrates a security image 900 captured by a security camera and displayed on a display 124 to communicate an exception item and/or exception situation. In the illustrated image 900, image data of a first item 902, a second item 904, and a third item 906 is included, as well as image data of the conveyor 108, which is also in the scene of the FOV of the security imager. In the illustrated embodiment, the items 902, 904, 906 are shown outlined in a patterned line, to indicate the status of each as an exception item. The first item 902 and second item 904 are shown outlined in a broken line to indicate that they are not exception items, and that they were scanned properly. The third item 906 is outlined in a bold line to indicate that the third item 906 is the exception item. A user or operator can easily recognize that the third item 906 is a can, and possibly even read the label on the third item 906, from the security image 900, allowing the user or operator to identify the third item 906 among items that have passed through the automated optical scanner. As can be appreciated, in other embodiments, other visual indicators and/or visual effects may be employed to distinguish exception items from properly scanned items in the security image 900. For example, color may be used as an indicator. Each properly scanned item may be outlined in a bold green line while each exception item may be outlined in a bold red line. In another embodiment, shading may be used as an indicator. Alternatively, exception items may be indicated in the security image 900 by a circle superimposed on the image about the item. In still another embodiment, merely an image of exception items is shown, without an indicator of the status of the item as an exception item.

In another embodiment, the security imager(s) of the automated optical scanner may employ CCD imager technology. Pixels of a CCD imager, particularly an interline-transfer CCD imager, are all exposed in effect simultaneously, the CCD imager operating similar to a global shutter CMOS imager. A CCD based security imager can be exposed synchronously with pulses of an illumination source, at a rate slower by a factor than the pulse rate of the illumination source.

In another embodiment, a mechanical shutter may be used to control exposure of the security imager(s). A mechanical shutter can have about the same effect as a global shutter, but instead of being a part of the solid-state device, a mechanical shutter is a mechanical system that periodically permits light to impinge, for example a rolling shutter CMOS imager. Thus, a rolling shutter CMOS imager with a mechanical shutter may start integrating the first row with the shutter closed, that is, blocking light from impinging the CMOS. The integration time for each row is long enough to permit all of the rows to be integrating during the same time period. After all of the rows are integrating, the mechanical shutter is opened for a short time to expose the pixels to light energy. The mechanical shutter is then closed. A global reset can be used in some rolling shutter CMOS imagers, which starts the exposure of all rows in the imager at the same time. The mechanical shutter is then open and shut and the rows are sequentially read out. Other rows of the image continue to expose until they are read out, but with the mechanical shutter closed, no additional light is integrated on these rows.

Various modifications, changes, and variations apparent to those of skill in the art may be made in the arrangement, operation, and details of the methods and systems of the disclosure without departing from the spirit and scope of the disclosure. Thus, it is to be understood that the embodiments described above have been presented by way of example, and not limitation.

Where a range of values is provided, it is understood that each intervening value, to the tenth of the unit of the lower limit unless the context clearly dictates otherwise, between the upper and lower limit of that range and any other stated or intervening value in that stated range is encompassed within the embodiments of the present invention. The upper and lower limits of these smaller ranges which may independently be included in the smaller ranges is also encompassed within the embodiments of the invention, subject to any specifically excluded limit in the stated range. Where the stated range includes one or both of the limits, ranges excluding either or both of those included limits are also included in the embodiments of the invention.

Unless defined otherwise, all technical and scientific terms used herein have the same meaning as commonly understood by one of ordinary skill in the art to which the embodiments of the invention belong. Although any methods and materials similar or equivalent to those described herein can also be used in the practice or testing of the embodiments of the present invention, the preferred methods and materials are now described. All patents and publications mentioned herein, including those cited in the Background of the application, are hereby incorporated by reference to disclose and describe the methods and/or materials in connection with which the publications are cited.

The publications discussed herein are provided solely for their disclosure prior to the filing date of the present application. Nothing herein is to be construed as an admission that the embodiments of the present invention are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the invention. It should be understood that various features and aspects of the disclosed embodiments can be combined with or substituted for one another in order to form varying modes of the disclosed embodiments of the present invention. Thus, it is intended that the scope of at least some of the present invention herein disclosed should not be limited by the particular disclosed embodiments described above.

It will be obvious to those having skill in the art that many changes may be made to the details of the above-described embodiments without departing from the underlying principles of the invention. The scope of the present invention should, therefore, be determined only by the following claims.

The invention claimed is:

1. An automated system for reading items bearing optical codes, comprising:
   a transport mechanism to transport items placed thereon through one or more read zones;
   an illumination source configured to illuminate the one or more read zones, the illumination source triggered to pulse light at a pulse rate;
   one or more decode imagers configured to capture image data and read an optical code disposed on an item transported through the one or more read zones, each decode imager having a field of view (FOV) directed to and defining at least one of the one or more read zones, wherein each decode imager is configured to capture image data of a scene in its corresponding read zone when triggered, including at least a portion of an item within the corresponding read zone when the decode imager is triggered, wherein each decode imager is triggered synchronously with pulses of the illumination source at a rate that is a factor of the pulse rate of the illumination source;
   a security imager configured to capture images of items that are transported through the data reader, such that the images captured by the security imager are used to identify exception items, wherein the security imager is triggered synchronous with the pulses of the illumination source and slower than the pulse rate of the illumination source; and
   a display to present images of exception items captured by the security imager.

2. The automated system of claim 1, wherein the pulse rate of the illumination source is higher than a flicker fusion frequency of human vision.

3. The automated system of claim 1, wherein the plurality of decode imagers comprises:
   a side imager positioned on a first side of the data reader and having an FOV directed across the transport mechanism to a second side of the data reader;
   a bottom imager positioned below a top surface of the transport mechanism and having an FOV directed above the transport mechanism; and
   a top imager positioned above the transport mechanism and having an FOV directed down onto the transport mechanism.

4. The automated system of claim 3, wherein the plurality of decode imagers further comprises a second side imager positioned on the second side of the data reader and having an FOV directed across the transport mechanism to the first side of the data reader.

5. The automated system of claim 1, wherein the security imager is triggered at a rate that is a factor of the rate at which the plurality of decode imagers are triggered.

6. The automated system of claim 1, wherein the security imager is triggered at a rate that is a factor of the pulse rate of the illumination source.

7. The automated system of claim 1, wherein the security imager comprises a CMOS imager with a global shutter.

8. The automated system of claim 1, wherein the illumination source pulses a white light.

9. The automated system of claim 1, wherein the security imager is triggered at a rate slower than the rate at which the plurality of decode imagers is triggered.

10. The automated system of claim 1, wherein the rate at which the illumination source is triggered is three times faster than the rate at which the plurality of decode imagers is triggered and six times faster than the rate at which the security imager is triggered.

11. The automated system of claim 1, wherein the security imager is triggered asynchronous to triggering of the plurality of decode imagers.

12. The automated system of claim 1, wherein the display provides an indication to aid in manually handling the exception.

13. The automated system of claim 1, wherein the display provides an indicator to designate an exception item.

14. The automated system of claim 1, wherein the rate at which the illumination source is triggered is faster than 60 Hz.

15. The automated system of claim 14, wherein the rate at which the illumination source is triggered is 90 Hz.

16. The automated system of claim 1, wherein the security imager is configured to capture complete images of items that are transported through the data reader.

17. An automated data reading system comprising:
   an optical data reader comprising:
   a first illumination source configured to illuminate a first set of the one or more read zones of the data reader, the first illumination source triggered to pulse light at a first pulse rate;
   a plurality of decode imagers configured to capture image data used to identify and read an optical code disposed on an item transported through one or more read zones, each decode imager having a field of view (FOV) directed to and defining one of the one or more read zones, wherein each decode imager is configured to capture image data of a scene in its corresponding read zone when triggered, including at least a portion of an item within the corresponding read zone when the decode imager is triggered, wherein a first set of the plurality of decode imagers is triggered synchronously with pulses of the first illumination source at a rate that is slower than the first pulse rate of the first illumination source; and
   a security imager configured to capture images of items that are transported through the one or more read zones, such that the images captured by the security imager are used to identify exception items, wherein the security imager is triggered synchronously with the pulses of the first illumination source at a rate that slower than the first pulse rate of the first illumination source;
a transport mechanism to automatically transport items placed thereon through the one or more read zones; and
a display to present images of exception items captured by the security imager.

18. The automated system of claim 17, wherein the optical data reader further comprises a second illumination source configured to illuminate a second set of the one or more read zones of the data reader, the second illumination source triggered to pulse light at a second pulse rate and out of phase of the pulsing of the first illumination source,
wherein a second set of the plurality of decode imagers is triggered synchronously with pulses of the second illumination source and slower than the second pulse rate of the second illumination source, and
wherein the security imager is triggered synchronously with the pulses of one of the first illumination source and the second illumination source at a rate that is slower than the first pulse rate of the first illumination source and the second pulse rate of the second illumination source.

19. The automated system of claim 18, wherein the first set of the plurality of decode imagers is triggered at a rate that is a factor of the first pulse rate of the first illumination source.

20. The automated system of claim 18, wherein the second set of the plurality of decode imagers is triggered at a rate that is a factor of the second pulse rate of the second illumination source.

21. The automated system of claim 17, wherein the plurality of decode imagers comprises:
a side imager positioned on a first side of the automated optical scanner and having a FOV directed across the transport mechanism to a second side of the data reader;
a bottom imager positioned below a top surface of the transport mechanism and having a FOV directed above the transport mechanism; and
a top imager positioned above the transport mechanism and having a FOV directed down onto the transport mechanism.

22. The automated system of claim 17, wherein the security imager is triggered at a rate that is a factor of the first pulse rate at which the first set of the plurality of decode imagers is triggered.

23. The automated system of claim 17, wherein the security imager comprises a CMOS imager with a global shutter.

24. The automated system of claim 17, wherein the illumination source pulses a white light.

25. The automated system of claim 17, wherein the security imager is triggered at a rate slower than the rate at which the plurality of decode imagers is triggered.

26. The automated system of claim 17, wherein the display provides an indication to aid in manually handling the exception.

27. The automated system of claim 17, wherein the rate at which the first illumination source is triggered is faster than 60 Hz.

28. A method of reading items bearing optical codes, the method comprising:
triggering an illumination source of an automated data reading system to pulse a light at a frequency;
pulsing the illumination source in response to the triggering of the illumination source;
triggering a plurality of decode imagers of the automated data reading system at a frequency that is slower than the frequency of the triggering of the illumination source, each of the plurality of decode imagers having a field of view directed to a read volume of the data reading system at a different perspective, wherein the illumination source is configured to illuminate the read volume;
capturing image data of the scene in the FOVs of the decode imagers in response to the triggering of the plurality of decode imagers and synchronous with light pulses of the illumination source, wherein each of the plurality of decode imagers is configured to capture image data of a scene in the FOV of the decode imager and illuminated by the illumination source, and wherein the image data is configured to be used to identify and read an optical code disposed on an item transported through the read volume of the automated data reading system;
triggering a security imager of the automated data reading system at a frequency that is slower than the frequency of the triggering of the illumination source, the security imager having a field of view (FOV) and being configured to capture images of items that are transported through the automated data reading system; and
capturing image data of the scene in the FOV of the security imager in response to the triggering the security imager and synchronous with light pulses of the illumination source, wherein the security imager is configured to capture images of items that are transported through the read volume of the automated data reading system, such that the images captured by the security imager are configured to be used to identify exception items.

29. The method of claim 28, wherein a frame rate of the security imager is slower than a frame rate of the plurality of decode imagers.

30. The method claim 28, wherein the rate at which the illumination source is triggered is three times faster than the rate at which the plurality of decode imagers are triggered and six times faster than the rate at which the security camera is triggered, such that capturing image data with the decode imagers occurs every third light pulse and capturing image data with the security imager occurs every sixth light pulse.

31. The method claim 28, further comprising displaying images of exception items captured by the security imager.

* * * * *